United States Patent [19]

Umeda

[11] Patent Number: 4,559,574
[45] Date of Patent: Dec. 17, 1985

[54] TAPE CASSETTE

[75] Inventor: Hiroyuki Umeda, Yokohama, Japan

[73] Assignee: Victor Company of Japan, Ltd., Yokohama, Japan

[21] Appl. No.: 667,382

[22] Filed: Nov. 1, 1984

Related U.S. Application Data

[63] Continuation of Ser. No. 322,766, Nov. 19, 1981, abandoned.

[30] Foreign Application Priority Data

| Nov. 25, 1980 [JP] | Japan | 55-96693[U] |
| Nov. 25, 1980 [JP] | Japan | 55-167532[U] |
| Aug. 13, 1981 [JP] | Japan | 56-119403[U] |

[51] Int. Cl.$^4$ ............................................. G11B 23/04
[52] U.S. Cl. ................................. 360/132; 360/94; 360/96.3; 242/199
[58] Field of Search ............... 360/94, 96.1, 96.3, 360/132; 242/197, 198, 199, 200

[56] References Cited

U.S. PATENT DOCUMENTS

| 3,800,321 | 3/1974 | Bolick | 360/94 |
| 4,183,477 | 1/1980 | Iwase | 360/94 |
| 4,185,307 | 1/1980 | Sato | 360/94 |
| 4,288,048 | 9/1981 | Sieben | 242/198 |

FOREIGN PATENT DOCUMENTS

| 1099755 | 2/1961 | Fed. Rep. of Germany . |
| 1240679 | 5/1967 | Fed. Rep. of Germany . |
| 2340753 | 2/1974 | Fed. Rep. of Germany . |
| 2242808 | 3/1974 | Fed. Rep. of Germany . |
| 2918271 | 11/1979 | Fed. Rep. of Germany . |
| 2031116 | 11/1970 | France . |
| 2451087 | 10/1980 | France . |
| 1134897 | 11/1968 | United Kingdom . |
| 1340310 | 12/1973 | United Kingdom . |
| 1341829 | 12/1973 | United Kingdom . |
| 1426889 | 3/1976 | United Kingdom . |
| 2019356 | 10/1979 | United Kingdom . |

Primary Examiner—Alan Faber
Attorney, Agent, or Firm—Louis Bernat

[57] ABSTRACT

A tape cassette loaded with respect to a recording and/or reproducing apparatus having a reel driving mechanism including at least one reel driving shaft comprises a cassette case, and a supply side reel and a take-up side reel provided within the cassette case, for winding a tape. One reel of the supply side and take-up side reels is constructed so that the reel driving shaft of the recording and/or reproducing apparatus is inserted into this one reel from a lower direction thereof to engage therewith when the tape cassette is loaded into the recording and/or reproducing apparatus, and driven at a center part of the one reel. The other reel of the supply side and take-up side reels is constructed so as to be transmitted of rotation by a rotation transmitting mechanism at a part other than a center part thereof and rotated.

15 Claims, 23 Drawing Figures

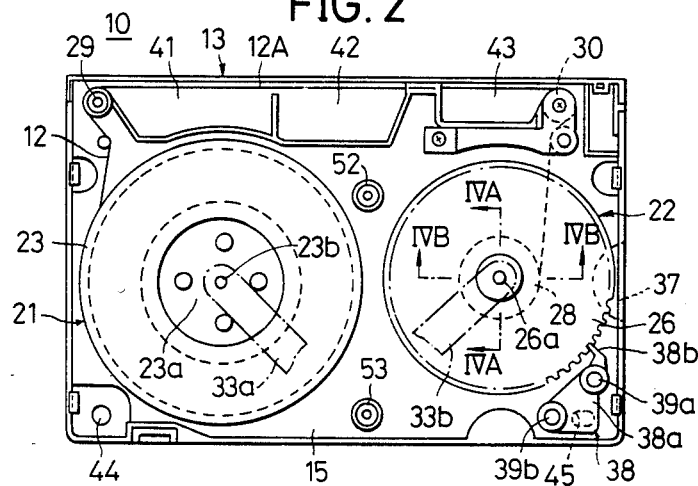
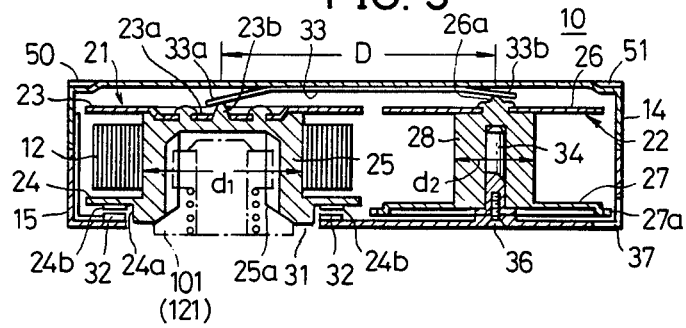
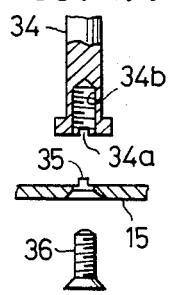
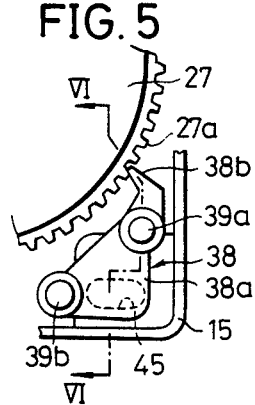
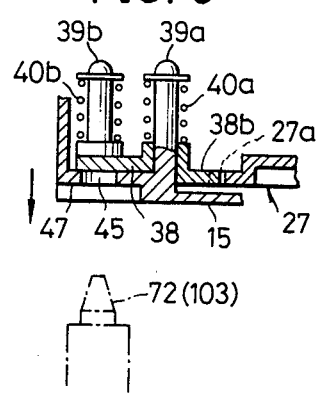
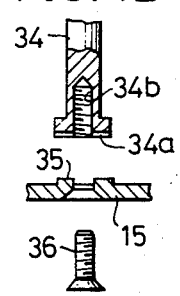

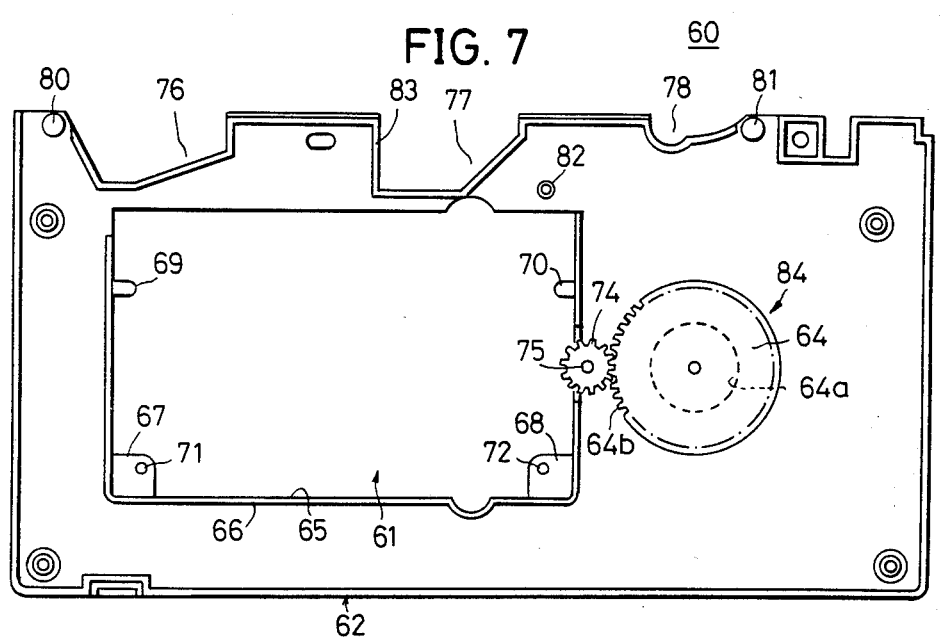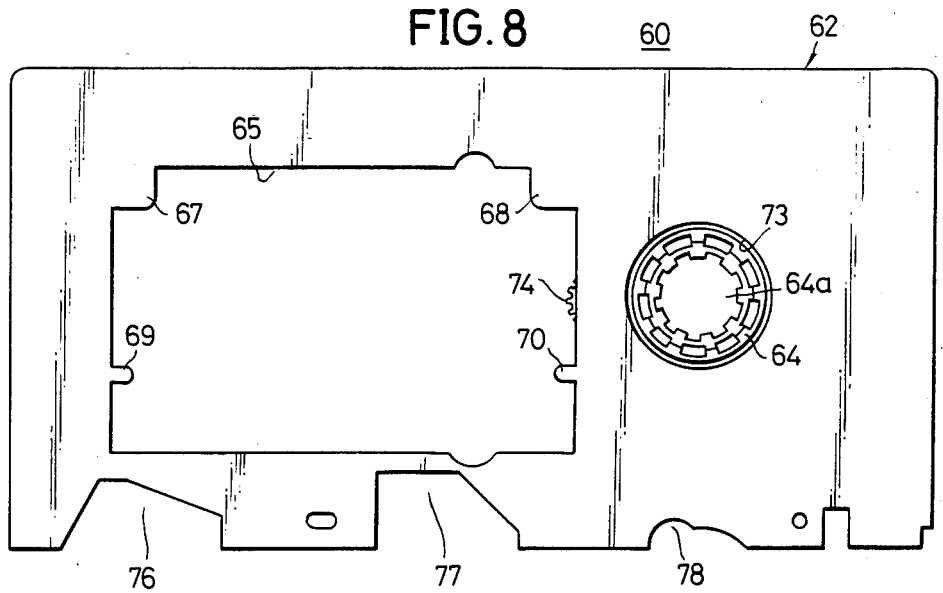

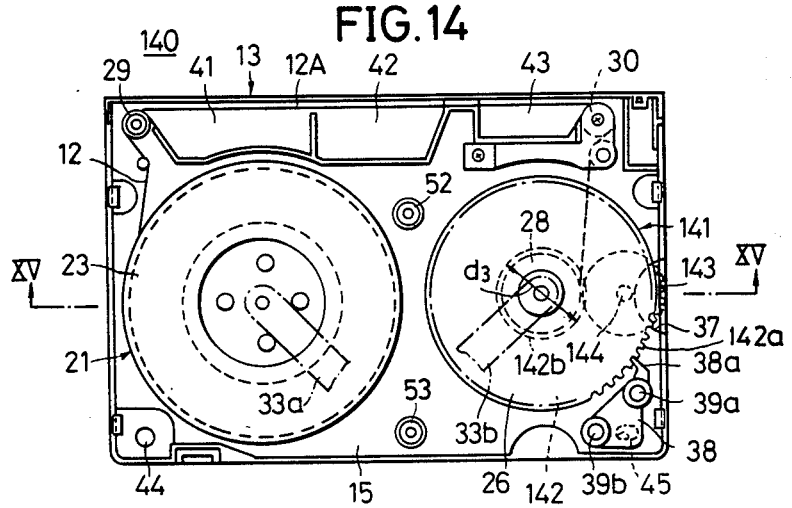
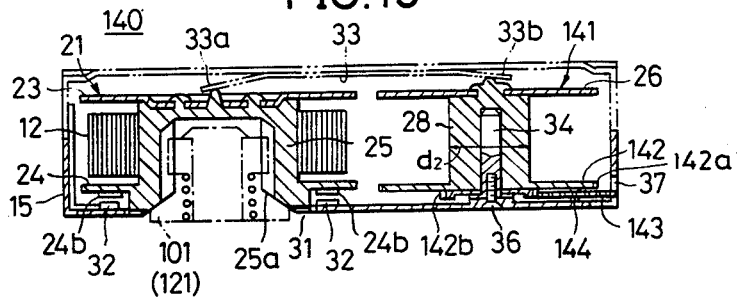
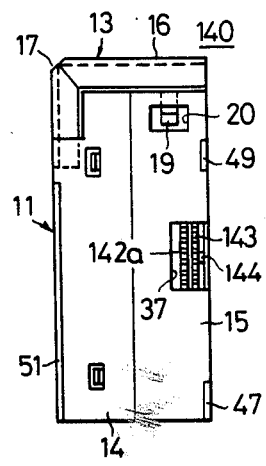
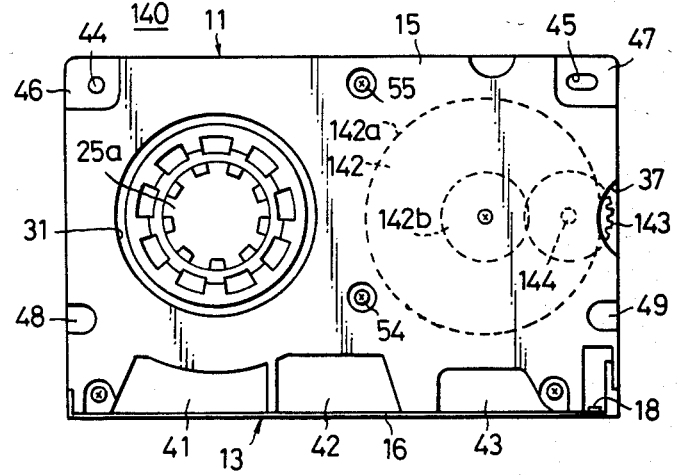

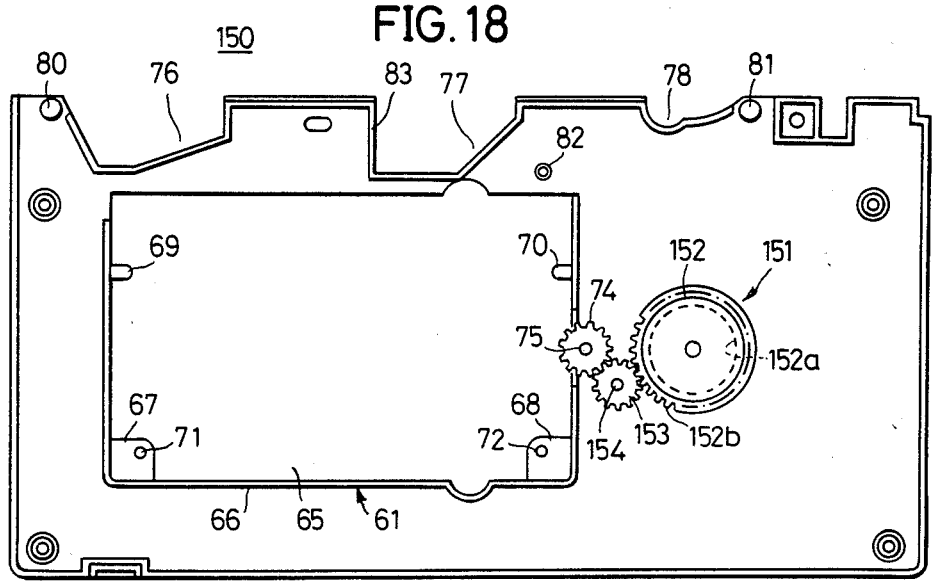
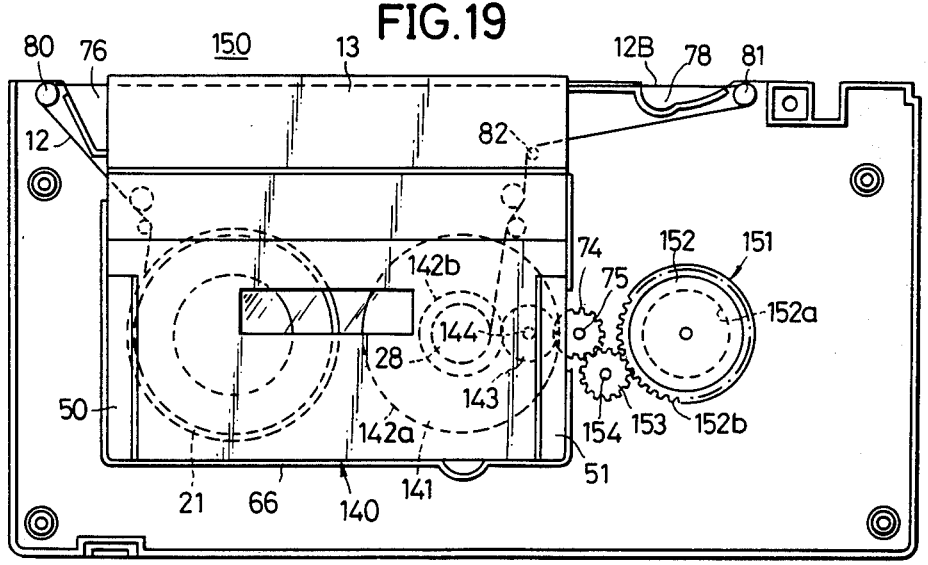

TAPE CASSETTE

This is a continuation of U.S. patent application Ser. No. 322,766, filed Nov. 19, 1981, and entitled "TAPE CASSETTE" now abandoned.

BACKGROUND OF THE INVENTION

The present invention generally relates to tape cassettes, and more particularly to a tape cassette having a construction such that one reel of a supply side reel and a take-up side reel, for example, the supply side reel, is fitted over a reel driving shaft of a recording and/or reproducing apparatus and rotated at a center part thereof, and the other reel, for example, the take-up side reel, is transmitted of rotation at a part other than a center part thereof and rotated.

Presently, video signal recording and/or reproducing apparatuses using tape cassettes are reduced to practical use on the world-wide basis. As types of these recording and/or reproducing apparatuses using tape cassettes, two or three standardized types of apparatuses presently exist world-widely. There is no interchangeability between apparatuses of different standards, however, interchangeability exists between apparatuses adopting the same standard. Accordingly, a tape cassette recorded by one recording and/or reproducing apparatus can be reproduced by another recording and/or reproducing apparatus of the same standard. Hence, in order to ensure interchangeability between different recording and/or reproducing apparatuses manufactured by different manufacturers so as to perform recording and/or reproduction, a standardization is set with respect to formats of the tape cassette and the recording and/or reproducing apparatus. That is, the above formats are standardized for each standard, and a standard type tape cassette and a standard type recording and/or reproducing apparatus are respectively provided and employed for each standard.

Recently, a problem of much importance involves the realization in reducing the size of the recording and/or reproducing apparatus main body. This is to realize a more compact portable type recording and/or reproducing apparatus, and, for example, to realize such an equipment that a recording apparatus is unitarily built into a television camera.

In this regard, some attempts have been made to realize a compact type recording and/or reproducing apparatus using a compact or miniature type tape cassette, which uses a tape pattern and format completely different from those of the standard type recording and/or reproducing apparatus using the standard type tape cassette which are already and widely accepted in the market. However, the above compact type recording and/or reproducing apparatus attempted for realization uses a format completely different from that of the standard type recording and/or reproducing apparatus, and interchangeability does not exist therebetween. Therefore, in this compact type recording and/or reproducing apparatus, there is a disadvantage in that a tape cassette recorded by the compact type recording and/or reproducing apparatus cannot be reproduced by the standard type recording and/or reproducing apparatus. This is a great inconvenience and disadvantage to the owners of the compact type recording and/or reproducing apparatus.

Another attempt has also been made to realize a compact type portable recording and/or reproducing apparatus which performs recording and/or reproduction with the same tape pattern and format as the standard type recording and/or reproducing apparatus, by using a tape cassette whose size is slightly reduced by reducing the tape quantity and the diameter of the reels from those of the standard type tape cassette. In this system, a tape cassette recorded by the portable recording and/or reproducing apparatus can be reproduced as it is by the standard type recording and/or reproducing apparatus.

However, in the tape cassette used in the above portable recording and/or reproducing apparatus, the distance between a supply side reel and a take-up side reel is set equal to the distance between the supply side and take-up side reels of the standard type tape cassette, so that the tape cassette used for the portable recording and/or reproducing apparatus can be loaded into the standard recording and/or reproducing apparatus. Hence, even when the tape quantity is reduced in order to reduce the diameter of the reels, there is a limit in reducing the diameter of these reels. Therefore, in this system, there was a disadvantage in that the size of the tape cassette as a whole could not be reduced significantly, and the same is true to the recording and/or reproducing apparatus.

Furthermore, another system can be considered in which the tape quantity is reduced to reduce the diameter of the reels, and further, the miniature type tape cassette is constructed by reducing the distance between the supply side and take-up side reels. In this system, as a modification of the standard type recording and/or reproducing apparatus, the recording and/or reproducing apparatus can be constructed so that a reel disc for driving the take-up side reel is movable. In this modification of the standard type recording and/or reproducing apparatus, the take-up side reel disc is at a normal position when loaded with the standard type tape cassette, and the take-up side reel disc is moved to a position closer to the supply side reel disc when loaded with the miniature type tape cassette.

However, even in this system, for example, there is a disadvantage in that the miniature type tape cassette recorded by the compact type recording and/or reproducing apparatus cannot be reproduced by the standard type recording and/or reproducing apparatus which is presently in wide use. Moreover, there is a disadvantage in that it is extremely difficult to realize a mechanism for moving the reel disc in the manner described above. Furthermore, the recording and/or reproducing apparatus using the tape cassette generally has a mechanism for drawing out the tape from within the tape cassette to load the tape onto a predetermined tape path within the recording and/or reproducing apparatus. Therefore, it is also exceedingly difficult to construct the above mechanism for pulling out the tape, so that interchangeability exists with respect to the above compact or miniature type tape cassette and the standard type tape cassette, and the realization of such a mechanism is virtually impossible.

SUMMARY OF THE INVENTION

Accordingly, it is a general object of the present invention to provide a novel and useful miniature type tape cassette in which the above described disadvantages have been overcome.

Another and more specific object of the present invention is to provide a tape cassette constructed so that one reel of a supply side reel and a take-up side reel is inserted and engaged with a reel driving shaft of a recording and/or reproducing apparatus from a lower direction thereof and rotationally driven at a center part thereof, and the other reel is transmitted of rotation at a part other than a center part thereof and rotated. According to the tape cassette of the present invention, since the above other reel is rotated in a state transmitted of rotation at the part other than the center part thereof, and the construction is such that a reel driving shaft of the recording and/or reproducing apparatus is not inserted into and engaged with the center part of the above other wheel, the distance between centers of rotation in the supply side reel and the take-up side reel can be set to a relatively small value, and the size of the tape cassette as a whole can thus be reduced. Moreover, while the tape cassette according to the present invention may be recorded and/or reproduced by a recording and/or reproducing apparatus exclusively for this type of a tape cassette, the tape cassette according to the present invention may also be recorded and/or reproduced by a standard type recording and/or reproducing apparatus when the tape cassette according to the present invention is accommodated within a tape cassette adapter having an external form and size substantially equal to a standard type tape cassette which is used with the widely used conventional standard type recording and/or reproducing apparatus.

Still another object of the present invention is to provide the above tape cassette constructed so that the above other reel rotates about a fixed shaft provided within a cassette case. According to the tape cassette of the present invention, the above other reel can rotate without play since the position of the above other reel is restricted by the fixed shaft, and the construction of the tape cassette can be simplified.

Another object of the present invention is to provide a tape cassette wherein the above one reel is the supply side reel and the above other reel is the take-up side reel. According to the tape cassette of the present invention, the rotational accuracy and the tape feeding accuracy are respectively high, since the supply side reel is driven by the reel driving shaft of the recording and/or reproducing apparatus. Furthermore, no inconveniences are introduced by the indirect driving of the take-up side reel from the side of the cassette case, since there is no strict demand with respect to the rotational accuracy of the take-up side reel.

Other objects and further features of the present invention will be apparent from the following detailed description when read in conjunction with the accompanying drawings.

BRIEF DESCRIPTION OF THE DRAWINGS

FIG. 2 is a plan view showing the tape cassette shown in FIG. 1A in a state where the upper half of the tape cassette is removed;

FIG. 3 is a perspective view showing a cross section of the tape cassette along a line III—III in FIG. 1A;

FIGS. 4A and 4B are cross-sectional views respectively showing a connection part between a supporting shaft of a take-up side reel and a lower half of the tape cassette, in a disassembled state, along lines IVA'IVA and IVB—IVB in FIG. 2;

FIG. 5 is an enlarged view showing a braking mechanism part of the take-up side reel shown in FIG. 2;

FIG. 6 is a perspective view, in cross section, showing the braking mechanism shown in FIG. 5 along a line VI—VI;

FIGS. 7 and 8 are a plan view and a bottom view respectively showing a lower half of an embodiment of a tape cassette adapter which is loaded with the tape cassette shown in FIG. 1A;

FIG. 14 is a plan view showing another embodiment of a tape cassette according to the present invention in a state where an upper half thereof is disassembled;

FIG. 15 is a cross-sectional diagram along a line XV—XV in FIG. 14;

FIGS. 16 an 17 are a side view and a bottom view respectively showing the tape cassette shown in FIG. 14;

FIG. 18 is a plan view showing a lower half of an embodiment of a tape cassette adapter wherein the tape cassette shown in FIG. 14 is accommodated; and FIG. 19 is a plan view showing a state where the tape cassette shown in FIG. 14 is accommodated within the lower half shown in FIG. 18.

DETAILED DESCRIPTION

Figure 1A:
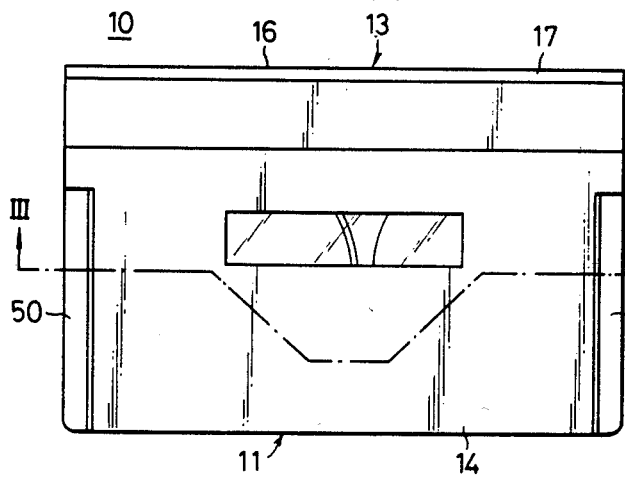
FIGS. 1A through 1D respectively are a plan view, a side view, a bottom view, and a rear view, showing a miniature type tape cassette as an embodiment of a tape cassette according to the present invention.

A miniature type tape cassette 10 according to the present invention has a configuration shown in FIGS. 1A through 1D, 2, and 3. The tape cassette 10 comprises a cassette case 11 having a size smaller than a standard type tape cassette which is loaded into a standard type video signal recording and/or reproducing apparatus. A lid 13 is provided on the front surface of the cassette case 11 in a manner such that the lid 13 can freely open and close, to protect a magnetic tape 12 accommodated within the tape cassette 10.

The cassette case 11 consists of an upper half 14 and a lower half 15. The lid 13 is moulded from a resin such as polypropylene, for example, and is mounted to the upper half 14. A front lid portion 16 of the lid 13 can rotate about a hinge portion 17 provided at the thinly moulded corner part of the lid 13. The above front lid portion 16 is urged by a leaf spring 18 towards a lid closing direction, to cover the front surface of the cassette case 11. When the tape cassette 10 is not loaded into a tape cassette adapter and a video signal recording and/or reproducing apparatus exclusively for the tape cassette 10 (description on these adapter and apparatus will be given hereinafter), the front lid portion 16 covers the front surface of the cassette case 11 to protect the magnetic tape 12 exposed with respect to this surface. Furthermore, a finger 19 formed on the front lid portion 16 engages with an opening 20 of the lower half 15, and the front lid portion 16 is thus locked in a closed state.

In addition, as shown in FIGS. 2 and 3, a supply side reel (supply reel) 21 and a take-up side reel (take-up reel) 22 are provided in a parallel manner inside the cassette case 11. A distance D between respective centers of the supply and take-up reels 21 and 22, is shorter than the distance between centers of the supply and take-up reels of the standard type tape cassette used in the standard type recording and/or reproducing apparatus. With respect to the supply reel 21, the magnetic tape 12 is wound a reel hub 25 between upper and lower flanges 23 and 24. Similarly, with respect to the take-up reel 22, the magnetic tape 12 is wound around a reel hub 28 between upper and lower flanges 26 and 27. The magnetic tape 12 is pulled out from the supply reel 21 and guided by guide poles 29 and 30 respectively provided on the left and right end sides along the front surface side of the cassette case 11, to form a tape path 12A reaching the take-up reel 22.

The supply reel 21 is provided in a state where a projecting step portion 24a of the lower flange 24 is loosely fitted into a hole 31 having a large diameter of the lower half 15. Moreover, teeth 24b are formed in a ring shape on the lower surface of the lower flange 24 and around the entire circular periphery thereof. Teeth 32 are formed in a ring shape on the upper surface of the lower half 15, at positions opposing the above teeth 24b. The supply reel 21 is urged towards the side of the lower half 15, by one arm portion 33a of a leaf spring 33 mounted on the lower surface of an upper plate of the upper half 14. Accordingly, in a normal state, the teeth 24b mesh with the teeth 32. Hence, the supply reel 21 is controlled and prevented from rotating, due to the above meshing of the teeth 24a and 32. Thus, the supply reel 21 does not unnecessarily rotate while the tape cassette 10 is manipulated or in transit. Therefore, the magnetic tape 12 is prevented from being tangled and damaged, since slack is not introduced in the magnetic tape 12 which is wound around the supply reel 21, and the magnetic tape 12 is prevented from being pulled unnecessarily out from the supply reel 21.

A reel driving shaft inserting part 25a is provided on the inner side of the reel hub 25 of the supply reel 21, into which a reel driving shaft of the recording and/or reproducing apparatus is inserted. The inner diameter of the above reel hub 25 is equal to the inner diameter of the reel hub of the supply reel in the standard type tape cassette. The reel shaft inserting part 25a is open on the side of the above hole 31.

Furthermore, a depression 23a is formed at the center portion on the upper surface side of the upper flange 23 of the supply reel 21. A projection 23b is formed at the center of the above depression 23a. The one arm portion 33a of the leaf spring 33 pushes the above projection 23b towards the downard direction, to urge the supply reel 21 towards the side of the lower half 15. As will be described hereinafter, the supply reel 21 is movable upwards and downwards upon loading of the tape cassette 10 into the recording and/or reproducing apparatus, and this slack of the supply reel 21 is relatively large. However, since the depression 23a is provided in the periphery of the projection 23b, the tip end of the arm portion 33a of the leaf spring 33 does not make contact with the upper flange 23 of the supply reel 21, when the supply reel 21 is moved upwards and downwards.

The take-up reel 22 is provided in a rotatable manner such that a fixed shaft 34 embeddedly provided on the lower half 15 is inserted into a center hole of the reel hub 28. A center projection 26a provided on the flat flange 26 is pushed by another arm portion 33b of the leaf spring 33 towards the downward direction, and the take-up reel 22 is urged towards the side of the lower half 15. Since the reel hub 28 is not inserted with a reel driving shaft, an outer diameter d2 of the reel hub 28 is smaller than an outer diameter d1 of the reel hub 25 of the supply reel 21. By this feature in which the outer diameter d2 of the reel hub 28 is smaller than the outer diameter d1 of the reel hub 25, the amount of magnetic tape 12 which can be accommodated within the tape cassette 10 becomes large as compared to the case where the outer diameters d1 and d2 of the reel hubs 25 and 28 are the same. Accordingly, although the size of the tape cassette 10 is small, recording and reproduction can be performed for a relatively long period of time by use of the above tape cassette 10.

The fixed shaft 34 is screwed onto the lower half 15 with a screw 36 into a threaded part 34b, in a state where a projection 35 provided on the lower half 15 is inserted into a groove 34a extending in the diametrical direction at the lower end part of the fixed shaft 34 as shown in FIGS. 4A and 4B. The above groove 34a and the projection 35 act as a detent when the projection 35 is inserted into the groove 34a, upon mounting the fixed shaft 34 onto the lower half 15 by the screw 36. Hence, the screw 36 can be screwed securely into the threaded part 34b, and the operation to fix the fixed shaft 34 onto the lower half 15 can be performed with a high operation efficiency. As will be described hereinafter, a rotational force of the take-up reel 22 acts on the fixed shaft 34 during recording and reproducing operations. However, the fixed shaft 34 does not rotate unnecessarily, due to the above described insertion of the projection 35 into the groove 34a. Accordingly, the screw 36 does not become loose since the fixed shaft 34 does not rotate, and the fixed shaft 34 is maintained in the initial fixed state without introducing instability in the fixed shaft 34. Therefore, the take-up reel 22 is always maintained in a predetermined position and rotates in a stable manner. Hence, the magnetic tape 12 can be smoothly taken up by the take-up reel 22 without damaging the magnetic tape 12, and the take-up reel 22 stably engages with a driving force transmitting mechanism as will be described hereinafter.

Moreover, a gear part 27a is formed on the outer peripheral part of the lower flange 27 of the take-up reel 22. As shown in FIGS. 1B, 1C, 2, and 3, a part of the gear part 27a is exposed through a cutout window 37 formed at a part between the side surface and the bottom surface of the lower half 15. The above cutout window 37 is of an arcuate shape on the bottom surface side of the lower half 15.

Furthermore, with respect to the take-up reel 22, a braking mechanism shown in FIGS. 5 and 6 is provided. A braking member 38 is supported by pins 39a and 39b on the lower half 15 which are inserted through a pair of holes provided in the braking member 38, in a freely slidable manner in the upward and downward directions. The above braking member 38 is urged downwards against the lower half by coil springs 40a and 40b fitted around the periphery of corresponding pins 39a and 39b in order to prevent the braking member 38 from slipping upwards. When the braking member 38 is urged by the coil springs 40a and 40b and is at a lowered position, a main body portion 38a of the braking member 38 closes a longitudinal hole 45 provided on the lower half 15 for positioning purpose which will be described hereinafter. Moreover, a finger portion 38b is at the same height position as the lower flange 27, and is inserted between adjacent teeth of the above gear part 27a. The take-up reel 22 is thus locked at that rotational position, and slack is not introduced in the magnetic tape 12 wound around the take-up reel 22. Moreover, the outer peripheral part of the lower flange 27 where the gear part 27a is formed, is a step lower than the flange surface at the inner peripheral side thereof.

The above braking member 38 moves upwards as will be described hereinafter, and in this raised state, the finger portion 38b disengages from the gear part 27a, and the locking operation with respect to the take-up reel 22 is accordingly released. Since the braking member 38 operates by moving parallel to the axis of the take-up reel 22, the braking member 38 does not hit against and damage the magnetic tape 12 wound around the take-up reel 22. Hence, the construction of the braking mechanism is simple. In addition, the above braking mechanism does not take up much space, and is convenient for reducing the size of the tape cassette 10. Furthermore, since the braking mechanism including the braking member 38 is placed at the corner part of the cassette case 11 without taking up additional space. This is advantageous also from this point of view in reducing the size of the tape cassette.

Openings 41 and 42 for accepting loading poles and an opening for accepting a capstan, are respectively provided in the bottom of the tape cassette 10 on the side of the lid 13. Moreover, a positioning hole 44 and the positioning longitudinal hole 45 are respectively provided in the bottom surface of the tape cassette 10, at left and right sides close to the rear side. These hole 44 and longitudinal hole 45 are respectively formed within depressions 46 and 47. In addition, depressions 48 and 49 are respectively formed in the bottom surface of the tape cassette 10 at the left and right sides on the side of the lid 13.

Depression 50 and 51 are formed on the left and right end sides of the tape cassette 10 shown in FIG. 1A, from substantially center position to the rear surface part thereof along the depth direction of the tape cassette 10.

Projections 52 and 53 of the lower half 15 is fitted into depressions (not shown) provided on the lower side of the upper half 14 to position the upper and lower halves 14 and 15 of the tape cassette 10, and these upper and lower halves 14 and 15 are connected together by screws 54 and 55.

FIGS. 7 through 11 respectively show a tape cassette adapter 60 which is used in a case where the tape cassette 10 having the above described construction is loaded into the standard type recording and/or reproducing apparatus.

The tape cassette adapter 60 has an accommodating part 61 for accommodating the above tape cassette 10, and has an external form and size substantial equal to those of the standard type tape cassette.

The above tape cassette adapter 60 consists of a lower half 62 and an upper half 63. The upper half 63 is fixed to the lower half 62 by screws after the tape cassette 10 is accommodated within the accommodating part 61 of the lower half 62.

The above accommodating part 61 for accommodating the above tape cassette 10 is formed as an opening at a predetermined position of the lower half 62. A rotation transmitting mechanism 84 is provided at a position adjacent to the above accommodating part 61. When the lower half 62 is placed on top of the standard type tape cassette for comparison, the supply reel 21 of the tape cassette 10 accommodated within the accommodating part 61 is arranged at a position corresponding to the position of the supply reel of the standard type tape cassette. In addition, a gear structure 64 of the rotation transmitting mechanism 84 is arranged at a position corresponding to the position of the take-up reel of the standard type tape cassette.

The accommodating part 61 consists of an opening 65 having a shape substantially identical to the shape of the tape cassette 10 shown in the plan view in FIG. 1A, a wall part 66 encircling three sides of the opening 65, and projections 67, 68, 69, and 70 extending within the opening 65 at positions in the bottom of the lower half 62. These projections are for positioning the tape cassette 10 when accommodated. Pins 71 and 72 are respectively embeddedly provided in the above projecting parts 67 and 68, for positioning the tape cassette 10.

Figure 11:
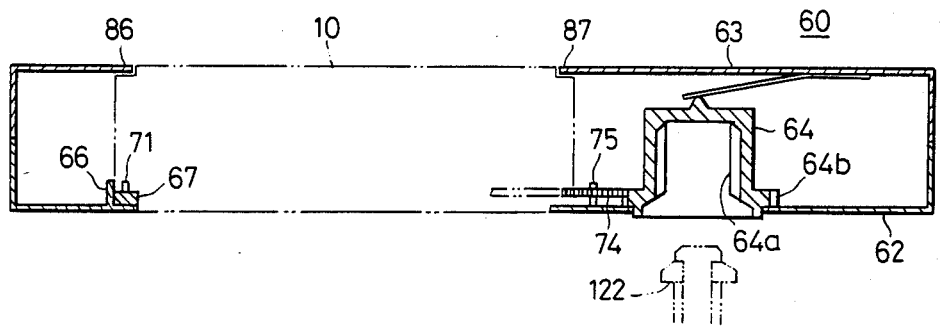
FIG. 11 is a cross-sectional view, with the tape cassette omitted, showing the tape cassette adapter along a line XI—XI in FIG. 10.

The gear structure 64 is provided in a rotatable manner at a position opposing a hole 73 in the lower half 62, as shown in FIGS. 8 and 11. A reel driving shaft inserting part 64a is provided at the inner part of the gear structure 64. Moreover, a gear part 64b is provided at the outer periphery of the above gear structure 64. A gear 74 having a small diameter meshes with the above gear part 64b. This gear 74 is axially supported by a shaft 75 on the lower half 62, and a part of the gear 74 protrudes into the above accommodating part 61.

Similarly as in the standard type tape cassette, openings 76 and 77 for inserting loading poles, and an opening 78 for inserting the capstan, are respectively provided in the front surface side of the lower half 62.

Furthermore, guide poles 80 and 81 are embeddedly provided at the end of the above opening 76 and at the end of the opening 78, respectively, in the lower half 62. Moreover, a guide pole 82 is embeddedly provided in the lower half 62, at a position opposing the guide pole 30. As will be described hereinafter, the guide poles 80 and 81 guide the magnetic tape 12 so that the magnetic tape 12 forms a tape path 12B along the front surface of the tape cassette adapter 60.

Figure 10:
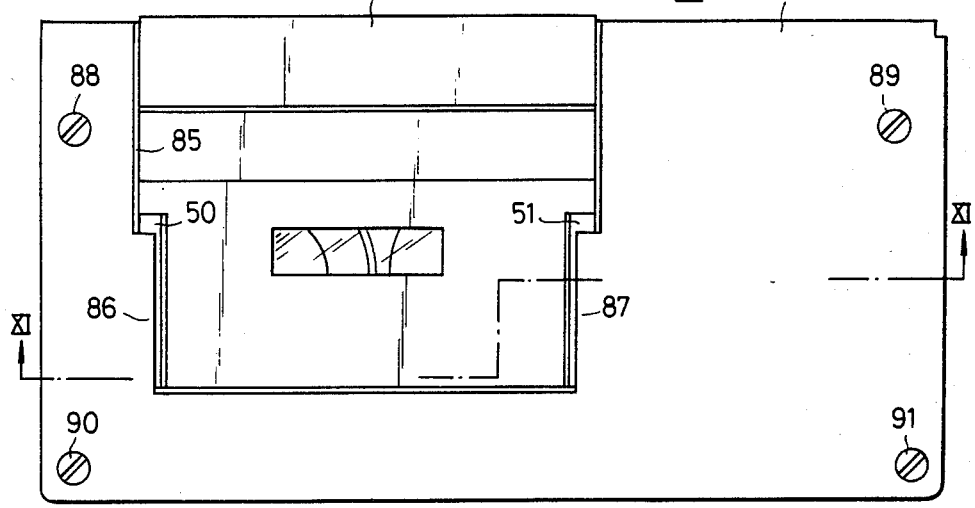
FIG. 10 is a plan view showing the tape cassette adapter in a state where an upper half if assembled to the lower half of the tape cassette adapter which is in the state shown in FIG. 9, to accommodate the tape cassette.

As shown in FIG. 10, the upper half 63 has an U-shaped cutout 85. Inwardly projecting parts 87 and 86 are respectively formed on the right and left sides at the innermost part of the cutout 85.

Next, description will be given to a case where the above tape cassette 10 is independently loaded into a recording and/or reproducing apparatus exclusively designed for the tape cassette 10, of a type different from the standard type recording and/or reproducing apparatus, such as a compact recording and/or reproducing apparatus of a type smaller than the standard type recording and/or reproducing apparatus, for example, by referring to FIG. 12.

Figure 12:
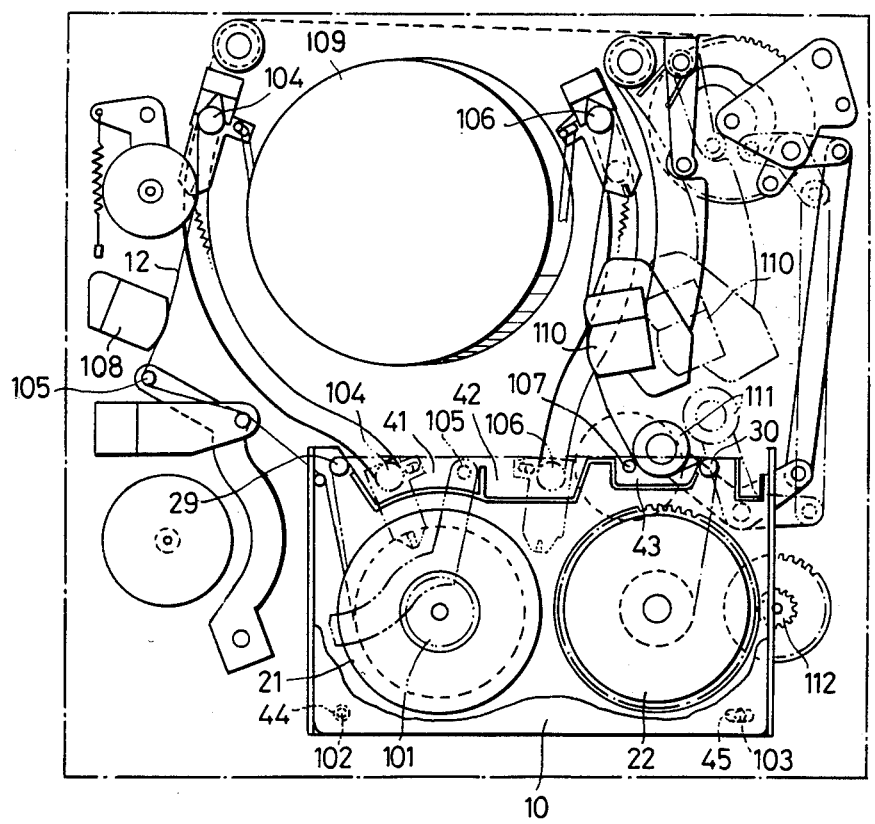
FIG. 12 is a plan view showing an example of a compact type recording and/or reproducing apparatus exclusively for the miniature type tape cassette which operates together with the tape cassette shown in FIG. 1A, in a state where the compact type recording and/or reproducing apparatus is in a recording or reproducing mode.

FIG. 12 shows a compact type recording and/or reproducing apparatus 100. The width and depth of this compact type recording and/or reproducing apparatus 100 are smaller than those of a standard type recording and/or reproducing apparatus 120 shown in FIG. 13, and the size of the compact type recording and/or reproducing apparatus 100 as a whole is small.

A supply reel driving shaft 101 is provided at a cassette loading part of the above compact type recording and/or reproducing apparatus 100, however, a take-up reel driving shaft is not provided. When the tape cassette 10 is loaded into the compact type recording and/or reproducing apparatus 100, the supply reel 21 is fitted over the supply reel driving shaft 101, in a positioned state where the hole 44 and the longitudinal hole 45 are fitted over pins 102 and 103. In addition, a loading pole 104 and a tension pole 105 relatively enter within the opening 41, while a loading pole 106 and a capstan 107 respectively and relatively enter into the opening 42.

In the above loaded state, the supply reel 21 is pushed upwards as shown in FIG. 3. Hence, the teeth 24b disengages from the teeth 32, and the supply reel 21 becomes freely rotatable. Moreover, the braking member 38 is pushed upwards against the forces exerted by the springs 40a and 40b, by the pin 103 inserted into the longitudinal hole 45. The finger portion 38b rises and the level of the finger portion 38b becomes different from that of the gear part 27a, to disengage from the gear part 27a. Accordingly, the take-up reel 22 is also released from the locked state, and becomes freely rotatable.

When the operational mode of the recording and/or reproducing apparatus is set to a play mode, the above poles 104, 105, and 106 intercept and engage with the magnetic tape 12 to draw out the magnetic tape 12, and respectively move to positions indicated by solid lines in FIG. 12. Hence, the magnetic tape 12 is drawn out of the tape cassette 10, to make contact with a full-width erasing head 108. The magnetic tape 12 further makes contact with a guide drum 109 provided with rotary video heads throughout a predetermined angular range, and also makes contact with an audio control head 110. Thus, the magnetic tape 12 is loaded onto a predetermined tape travelling path. During recording and reproduction, the magnetic tape 12 is driven in a state pinched between the capstan 107 and a pinch roller 111. Moreover, a driving gear 112 which is rotated by a reel driving motor (not shown) meshes with the gear part 27a of the take-up reel 22, and the take-up reel 22 is accordingly driven towards a tape take-up direction.

The full-width erasing head 108, the audio control head 110, and the guide drum 109 are constructed under the same standard as corresponding heads and guide drum of the standard type recording and/or reproducing apparatus which will be described hereinafter. Accordingly, a signal is recorded onto and reproduced from the magnetic tape 12 with a tape pattern and format identical to those obtained by the standard type recording and/or reproducing apparatus.

Next, description will be given for a case where the above tape cassette 10 is used by loading the tape cassette 10 into the standard type recording and/or reproducing apparatus, by referring to FIG. 13.

In this case, the tape cassette 10 is accommodated within the tape cassette adapter 60 to form the above described predetermined tape path within the tape cassette adapter 60. This tape cassette adapter 60 accommodating the tape cassette 10 is loaded into the recording and/or reproducing apparatus as in the case where the standard type tape cassette is loaded.

Figure 1B:
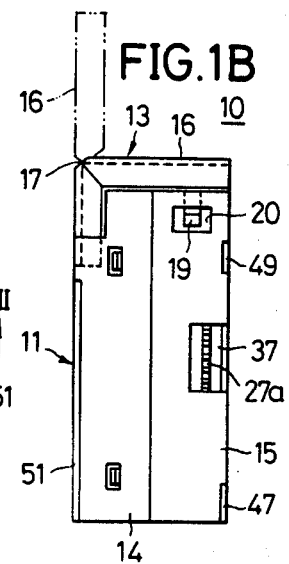
Figure 1C:
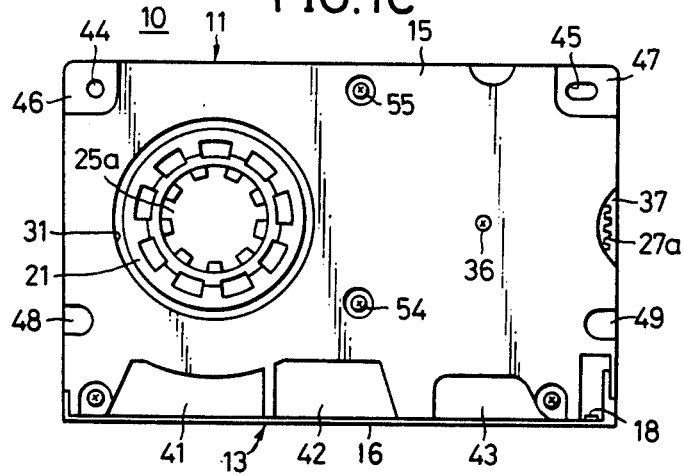
Figure 1D:
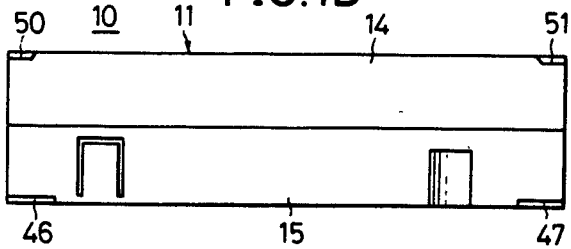

In order to accommodate the tape cassette 10 within the tape cassette adapter 60, the front lid portion 16 of the tape cassette 10 is first opened as indicated by a two-dot chain line in FIG. 1B. Then, the magnetic tape 12 is drawn out from the tape cassette 10 by a predetermined length. In this state, the take-up reel 22 is in a locked state and does not rotate. However, the supply reel 21 is reluctantly movable when the teeth 24b ride over the teeth 32 against the force exerted by the leaf spring 33. Hence, the magnetic tape 12 is drawn out from the supply reel 21. In a case where the supply reel 21 does not rotate smoothly, the magnetic tape 12 may be drawn out while pushing the supply reel 21 upwards by a finger to release the teeth engagement of the supply reel 21 with the teeth 32.

Figure 9:
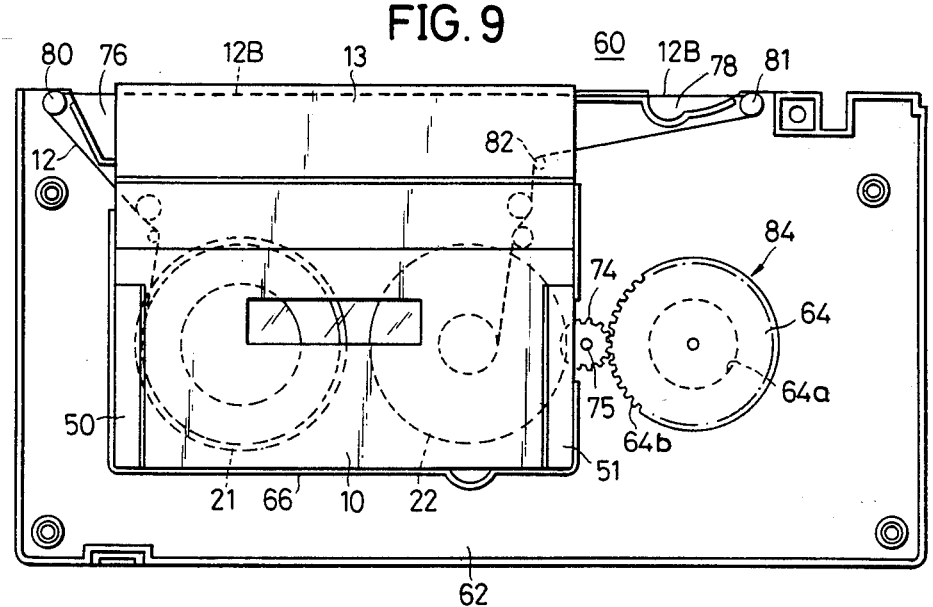
FIG. 9 is a plan view showing a state where the tape cassette shown in FIGS. 1A through 1D is loaded into the lower half of the tape cassette adapter shown in FIG. 7, and the tape is drawn out from the tape cassette to form a predetermined tape path.

In the above state, as shown in FIG. 9, the tape cassette 10 is accommodated within the accommodating part 61 in the lower half 62, and the magnetic tape 12 which is drawn out is threaded around the guide poles 80, 81, and 82 so as to be guided by these guide poles. Accordingly, the magnetic tape 12 is guided especially by these guide poles 80 and 81 in particular as shown in FIG. 9, and forms the tape path 12B traversing the front surface of the openings 76, 77, and 78, as in the case of the standard type tape cassette. Then, the upper half 63 is placed over the lower half 62 as shown in FIG. 10, and these upper and lower halves 62 and 63 are connected to each other by screws 88 through 91. Therefore, as shown in FIGS. 10 and 11, the tape cassette adapter 60 accommodates the tape cassette 10 therein, in a state where the magnetic tape 12 is drawn out from the tape cassette 10 and guided along the predetermined tape path 12B.

Next, description will be given with respect to the operation of each parts, when the tape cassette 10 is accommodated within the tape cassette adapter 60.

The tape cassette 10 is placed from above and accommodated within the accommodating part 61. In this state, the depressions 46 through 49 provided at the bottom of the tape cassette 10 respectively make contact with the projections 67 through 70 of the lower half 62. The peripheral side walls of the tape cassette 10 oppose the wall part 66 of the lower half 62. Furthermore, the hole 44 and the longitudinal hole 45 provided on the lower half 15 of the tape cassette 10 relatively fit over the pins 71 and 72, to position the tape cassette 10 within the accommodating part 61. The pin 72 in particular relatively passes through the longitudinal hole 45 as shown in FIG. 6, to push the braking member 38 upwards against the forces exerted by the coil springs 40a and 40b. That is, the braking member 38 is pushed upwards along the axial direction of the take-up reel 22. Hence, similarly as in the case described above, the finger portion 38b of the braking member 38 disengages from the gear part 27a towards the upward direction, to release the locked take-up reel 22. At the same time, the gear 74 relatively enters within the cutout window 37 from below, to mesh with the gear part 27a. The gear 74 may be constructed to undergo slight movement so that the gear 74 meshes with the gear part 27a without difficulty. The lid 13 makes contact with a rib part 83 formed along the openings 76 and 77 of the lower half 62, and is maintained in a state closing the openings.

The upper half 63 of the tape cassette adapter 60 is mounted to the lower half 62 in a state where the inwardly projecting parts 86 and 87 respectively engage with the depressions 50 and 51 provided on the upper surface of the tape cassette 10. Hence, the tape cassette 10 is pushed by the projections 67 through 70 of the lower half 62 and by the inwardly projections 86 and 87 of the upper half 63. The tape cassette 10 is thus positioned with respect to the direction of the thickness thereof, so that the tape cassette 10 does not slip out from the accommodating part 61. Furthermore, the tape cassette 10 is accommodated within the accommodating part 61 in a state where the upper surface and bottom surface of the tape cassette 10 lie in substantially the same planes as the upper surface and bottom surface of the tape cassette adapter 60.

Figure 13:
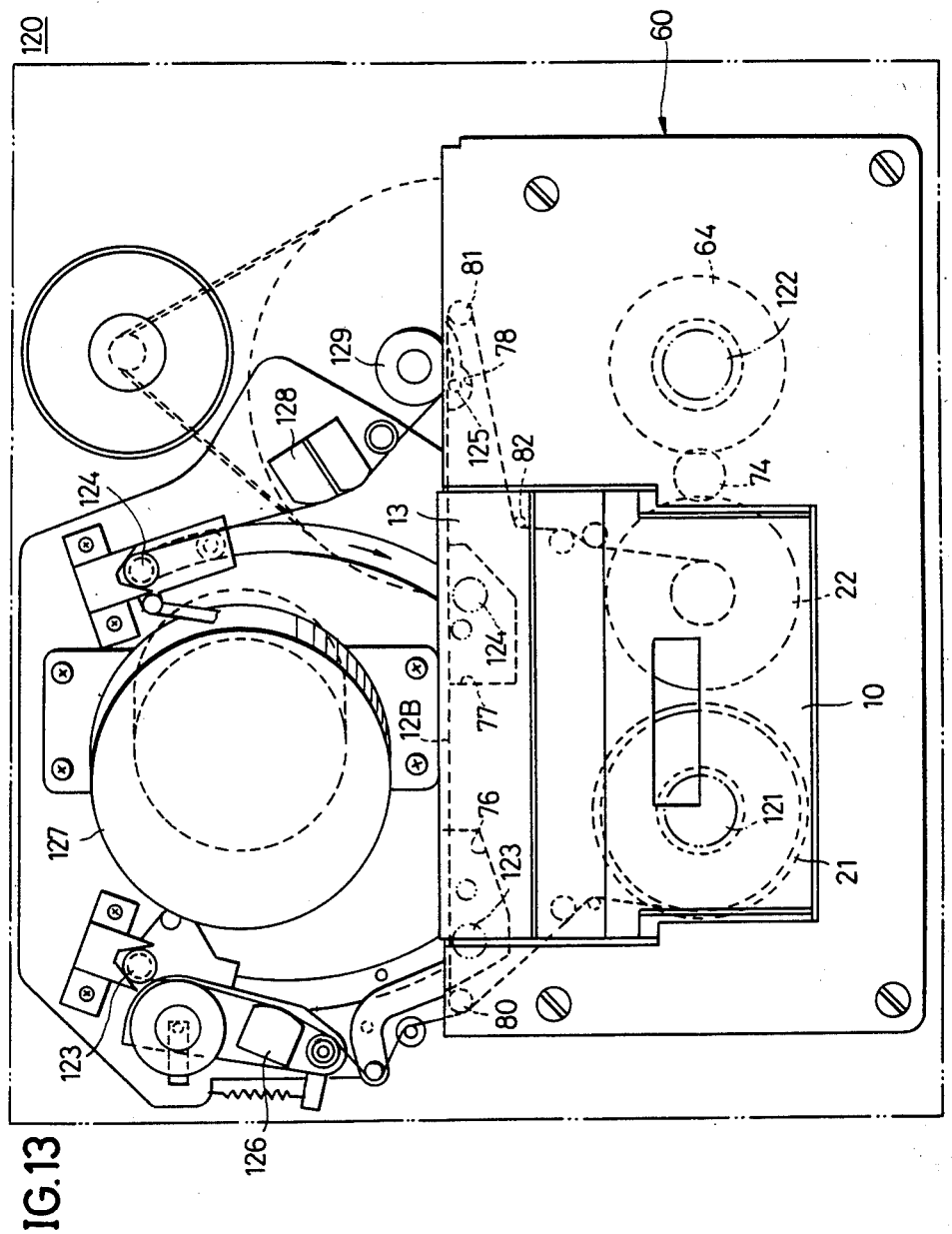
FIG. 13 is a plan view showing an example of a standard type recording and/or reproducing apparatus which operates together with the tape cassette adapter loaded with the tape cassette shown in FIG. 10, in a state where the standard type recording and/or reproducing apparatus is in a recording or reproducing mode.

FIG. 13 shows the standard type recording and/or reproducing apparatus 120. The above tape cassette adapter 60 accommodating the tape cassette 10 therein, is loaded into the standard type recording and/or reproducing apparatus 120 in a similar manner as in the case where the standard type tape cassette is loaded. That is, when the above tape cassette adapter 60 is loaded into the standard type recording and/or reproducing apparatus 120, a supply reel driving shaft 121 is inserted into the reel driving shaft inserting part 25a of the supply reel 21, and a take-up reel driving shaft 122 is inserted into the reel driving shaft inserting part 64a of the gear structure 64 within the tape cassette adapter 60. Furthermore, loading poles 123 and 124 and a capstan 125 respectively enter into the openings 76, 77, and 78 behind the tape path 12B (refer to FIGS. 7 and 9). In addition, in the above loaded state, as in the case of the compact type recording and/or reproducing apparatus 100, the supply reel 21 is pushed upwards as shown in FIG. 3. Accordingly, the locking operation with respect to the supply reel 21 is released, and the supply reel 21 becomes freely rotatable. As described above, the take-up reel 22 is released from the locked state and is already in a freely rotatable state, in the state where the tape cassette 10 is accommodated within the tape cassette adapter 60.

Upon a tape loading operation, the above loading poles 123 and 124 respectively intercept and engage with the magnetic tape 12, then draw the magnetic tape 12 out of the cassette as the loading poles 123 and 124 move away from the openings 76 and 77, and reach positions indicated by solid lines in FIG. 13. Accordingly, the magnetic tape 12 which is drawn outside the tape cassette adapter 60, makes contact with a full-width erasing head 126, and makes contact with a guide drum 127 provided with rotary video heads throughout a predetermined angular range. The magnetic tape 12 further makes contact with an audio control head 128. Therefore, the above magnetic tape 12 loaded onto a predetermined tape travelling path.

During recording and reproduction, the magnetic tape 12 is driven in a state pinched between a capstan 129 and a pinch roller 125. Moreover, the gear structure 64 within the tape cassette adapter 60 is rotated in the clockwise direction by the take-up reel driving shaft 122. This rotation of the gear structure 64 is transmitted to the take-up reel 22 through the gear 74, to drive the magnetic tape 12 towards a tape take-up direction. Accordingly, the magnetic tape 12 fed out by the capstan 129 is taken-up by the take-up reel 22. The magnetic tape 12 is guided by the guide poles 81 and 82 within the tape cassette adapter 60.

In either case where the above tape cassette 10 is independently loaded into the compact type recording and/or reproducing apparatus 100 or the tape cassette 10 is loaded into the standard type recording and/or reproducing apparatus 120 in a state accommodated within the tape cassette adapter 60, the supply reel 21 fits over the supply reel driving shaft 101 (121) provided in the recording and/or reproducing apparatus, and the supply reel 21 is directly driven. Hence, the rotational accuracy of the supply reel 21 becomes high, and a highly accurate tape feeding operation can be obtained. Moreover, since the diameter d1 of the reel hub 25 in the supply reel 21 is large, the difference between the maximum and minimum diameters of the roll of the wound-tape on the above supply reel 21 is relatively small. Accordingly, the varying range of the rotational speed of the supply reel 21 from the start to the completion of recording and reproduction is small, and the tape running accuracy is improved.

On the other hand, with respect to the take-up reel 22, the take-up reel 22 is not fitted over the take-up reel driving shaft in either case where the above tape cassette 10 is independently loaded into the compact type recording and/or reproducing apparatus 100 or the standard type recording and/or reproducing apparatus 120 in a state accommodated within the tape cassette adapter 60. Thus, to a given size of the cassette, an amount of tape to be accommodated can be increased, or the size of the cassette case 11 can be reduced to a given amount of tape. The above take-up reel 22 is indirectly driven from the side of the cassette case 11 through the gear structure 64 and the gear 74. However, since there is no strict requirements in the rotational accuracy of the take-up reel 22, no drawbacks are introduced. Further, as the take-up reel 22 rotates without play around the fixed shaft 34, no extra space is required around the reel, and this helps to reduce the size of the tape cassette.

When the tape cassette 10 is unloaded from the loading part of the compact type recording and/or reproducing apparatus 100, the supply reel 21 and the braking member 38 respectively move downwards. Thus, the supply reel 21 and the take-up reel 22 are both automatically locked so as not to rotate. Moreover, when the tape cassette 10 is removed from the tape cassette adapter 60, after the tape cassette adapter 60 is unloaded from the loading part of the standard type recording and/or reproducing apparatus 120, the braking member 38 similarly moves downwards to lock the tape-up reel 22.

Next, description will be given with respect to still another embodiment of a tape cassette, by referring to FIGS. 14 through 17. In FIGS. 14 through 17, those parts which are the same as those corresponding parts in FIGS. 1B, 1C, 2, and 3 are designated by like reference numerals, and their description will be omitted.

A tape cassette 140 is the same as the above described tape cassette 10 except for the construction in the periphery of a lower flange of a take-up reel 141.

A lower flange 142 of the take-up reel 141 has a flat surface from the inner periphery to the outermost periphery thereof, and is provided with a gear part 142a at the outer peripheral surface thereof. This gear part 142a engages with the braking member 38, to lock the take-up reel 141 so as not to rotate, as in the case of the above tape cassette 10.

A gear part 142b is provided at the lower surface of the lower flange 142. A diameter d3 of this gear part 142b is smaller than the diameter of a lower flange 142, and is substantially equal to the diameter of the reel hub 28. This diameter d3 is smaller than the diameter of the corresponding gear part 27a in the tape cassette 10 shown in FIG. 3, and for example, is set to a value which is approximately one-half the diameter of the above gear part 27a.

A gear 143 which is axially supported by a pin 144, is provided on the lower half 15. This gear 143 is arranged and provided at a position on the lower side of the lower flange 142. One end side of the gear 143 meshes with the above gear part 142b while the other end side is exposed through the cutout window 37 in the lower half 15, with respect to one diametrical direction of the gear 143. The diameter of this gear 143 is substantially equal to the diameter of the above gear part 142b.

The tape cassette 140 having the above described construction is accommodated within a tape cassette adapter having an inner construction different from that of the tape cassette adapter shown in FIG. 10. FIG. 18 shows a lower half 150 of this tape cassette adapter. The lower half 150 is identical to the lower half 62 shown in FIG. 7 except for a rotation transmitting mechanism 151. A gear structure 152 in the above rotation transmitting mechanism 151 has a reel inserting hole 152a into which the take-up reel driving shaft is inserted, at the inner part thereof, and a gear part 152b formed at the peripheral surface thereof. A gear 153 is axially supported by a pin 154 provided on the lower half, in a state where the gear 153 meshes with the above gear part 152b and the gear 74.

The tape cassette 140 is accommodated within a tape cassette adapter in a similar manner as in the case of the above tape cassette 10. FIG. 19 shows a state where the tape cassette 140 is accommodated in the lower half 150 of the tape cassette adapter. The tape cassette 140 is positioned and accommodated within the tape cassette adapter in a state wherein the gear 143 meshes with the gear 74. As shown in FIG. 13, the tape cassette adapter accommodating the tape cassette 140 therein, is loaded into the standard type recording and/or reproducing apparatus 120. During recording and reproducing modes, the gear structure 152 engages with the take-up reel shaft 122 (refer to FIG. 11) and rotates in the clockwise direction.

This rotation of the gear structure 152 is transmitted to the gear part 142b, by way of the gears 153, 74, and 143. Hence, the take-up reel 141 rotates in the clockwise direction, to take-up the magnetic tape 12 around the reel hub 28. Here, the reel hub 28 must be rotated at a predetermined rotational speed, so that slack is not introduced in the magnetic tape 12 which is successively fed when the magnetic tape 12 is taken-up. On the other hand, since the diameter d2 of the reel hub 28 in the above take-up reel 141 is small, the value for the above predetermined rotational speed becomes a high value. However, in the present embodiment of the invention, the diameter d3 of the gear part 142b of the take-up reel 141 is small. Accordingly, the small-diameter gears 153, 74, and 143 which are required for rotating the take-up reel 141 at the above predetermined rotational speed, need only be rotated at considerably low rotational speeds compared to the case of the first embodiment of the invention. Therefore, the rotation transmitting mechanism system can operate in a stable manner, and long serviceable life of the system can be assured.

Furthermore, since the diameter d3 of the gear part 142b of the take-up reel 141 is small, the take-up reel 141 can be rotated at a high rotational speed without subjecting the rotation transmitting mechanism system to an excessive load. Thus, the diameter of the reel hub 28 in the take-up reel 141 can further be reduced, and the tape cassette 140 accordingly becomes capable of winding and accommodating a larger quantity of tape.

In addition, in relation to the gear 143 provided within the tape cassette 140, the gear 153 is provided within the tape cassette adapter. Hence, the take-up reel 141 rotates towards the same direction as the take-up reel shaft 122, and the take-up reel 141 winds the tape in a manner similar to that performed by the take-up reel of the standard type tape cassette. This is also true with respect to the above described tape cassette 10.

In a case where the tape cassette 140 is loaded into the compact type recording and/or reproducing apparatus 100, the gear 143 meshes with the driving gear 112 of the compact type recording and/or reproducing apparatus 100. In this case, the driving gear 112 rotates towards a direction opposite to that when the compact type recording and/or reproducing apparatus 100 is loaded with the tape cassette 10. However, the take-up reel 141 is rotated towards the clockwise direction as in the case where the tape cassette adapter is used, through the gear 143.

In each of the above embodiments of the invention, instead of providing the gear part at the peripheral side surface of the lower flange 27 of the take-up reel 22 within the tape cassette 10, and providing a rotation transmitting pulley instead of the gear 143 in the tape cassette 140, a rubber roller may be used in the rotation transmitting mechanism within the tape cassette adapters according to the above first and second embodiments of the invention. In this case, the rotation is transmmitted to the take-up reel 22 within the tape cassette 10, and to the rotation transmitting pulley within the tape cassette 140, by use of the friction introduced therebetween.

Moreover, the gear part at the periphery of the lower flange of the take-up reel 22 in the tape cassette 10 may be formed as a bevel gear part. In this case, a bevel gear provided on a horizontal shaft of the adapter 60 or the side of the apparatus, relatively enters through an opening on the bottom surface side of the tape cassette of the cutout window 37 provided in the tape cassette 10. Accordingly, the bevel gear meshes with the above bevel gear part of the lower flange, in a state where the bevel gear crosses the lower flange 27 in a perpendicular manner.

Further, the present invention is not limited to these embodiments, but various variations and modifications may be made without departing from the scope of the present invention.

What is claimed is:

1. A tape cassette comprising a case having a base plate, a supply reel having a relatively large diameter hub and flange means, coupling means formed in the bottom center of said large diameter hub, a take-up reel having a relatively small diameter hub and flange means with a center hole therein, said supply and take-up reels being positioned inside said case in a side-by-side relationship with a tape path extending therebetween, an upstanding shaft mounted on and fixed to said base plate for receiving said center hole and rotatably supporting said take-up reel, said coupling means being positioned over an opening in said base plate for receiving a driving shaft of a recording/reproducing apparatus, said driving shaft supporting and rotating the supply reel in said cassette responsive to power supplied from said apparatus through said driving shaft to said coupling means, said take-up reel further having meshing means formed around at least the periphery of said flange means for meshing with a driving meshing means in said apparatus to rotate said take-up reel responsive to power supplied from said apparatus through said driving meshing means to the meshing means formed around the periphery of said flange means, said meshing means and said driving meshing means meshing with each other in a side-by-side relationship.

2. The tape cassette as claimed in claim 1 in which said take-up reel has at least a lower reel flange, said meshing means being formed around an outer peripheral part of said lower reel flange, and said cassette case has an opening at a part corresponding to said lower reel flange for enabling said meshing with said driving meshing means.

3. The tape cassette as claimed in claim 2 in which said meshing means comprises gear teeth formed around the outer peripheral part of said lower reel flange.

4. The tape cassette as claimed in claim 1 in which said flange means of said take-up reel comprises an upper reel flange and a lower reel flange, and said meshing means is formed around an outer peripheral part of said lower reel flange.

5. The tape cassette as claimed in claim 1 in which said flange means of said take-up reel comprises an upper reel flange and a lower reel flange, said cassette further comprising a braking member which is movable in upward and downward directions for braking rotation of said take-up reel by making contact with at least one of said upper and lower reel flanges, and urging means for normally urging said braking member downwardly, said braking member and said urging means being positioned inside said cassette case, and means for displacing said braking member upwardly to separate said braking member from said contact with said one of said flanges.

6. The tape cassette as claimed in claim 5 in which the periphery of one of said upper and lower reel flanges of said take-up reel comprises gear teeth which form said meshing means for transmitting rotational energy, and said braking member meshes with said gear teeth on said recording/reproducing apparatus in order to perform a braking operation.

7. The tape cassette as claimed in claim 5 in which said cassette case has a lower surface with a second hole formed therein at a position corresponding to the position of said braking member, and a pin member inserted through said second hole for displacing said braking member upwardly responsive to said pin moving against the urging force of said urging means to release the braking operation.

8. The tape cassette as claimed in claim 7 and a loading part in said recording/reproducing apparatus for receiving said tape cassette, said loading part having said pin member, and said pin member moving through said second hole of said cassette case for raising said braking member when said tape cassette is loaded into said loading part.

9. The tape cassette as claimed in claim 7 in which said recording/reproducing apparatus uses a standard type tape cassette which is larger than said case, an adapter having the size and shape of said standard type tape cassette, said adapter having means for receiving said tape cassette case, said pin member being mounted on said adapter at a position which receives said cassette case, said pin member passing through said second hole of said cassette case and raising said braking member when said tape cassette is received in said adapter.

10. The tape cassette as claimed in claim 9 and a pin-shaped member positioned on said adapter to form a pair with said pin member, a third hole formed in the lower surface of said cassette case, said third hole forming a pair with said second hole, and said pair of said pin member and said pin-shaped members being inserted into said pair of holes to position said cassette case in said adapter.

11. The tape cassette as claimed in claim 10 in which said cassette case has depressions or projections which are complementary with projections or depressions on a tape cassette adapter in order to index the positions of said adapter and said cassette.

12. The tape cassette as claimed in claim 1 in which said supply reel has a lower flange and is mounted to move upwardly and downwardly, said supply reel raising to engage said coupling means when said driving shaft is inserted into said supply reel, said tape cassette further comprising urging means for normally urging said supply reel in a downward direction to a position which restricts rotation of said supply reel by pressing a bottom surface of said lower flange into contact with said cassette case.

13. The tape cassette as claimed in claim 12 in which each of said reels has an upper surface with a projection at its center, said urging means comprising at least one leaf spring for making contact with the center projection on each of said reels to urge said reels downwardly, and a depression formed at an outer periphery of the center projection on said supply reel.

14. The tape cassette as claimed in claim 12 and a plurality of teeth formed at the bottom surface of the lower reel flange of said supply reel, a surface on said cassette case having complementary teeth at a level corresponding to said lower reel flange for meshing with the teeth formed on said lower reel flange, and means for restricting rotation of said reel flange responsive to an engagement between the teeth on the lower reel flange of said supply reel and the teeth on said cassette case when said urging means urges said supply reel in the downward direction.

15. The tape cassette as claimed in claim 1 in which said fixed shaft has a lower end with a non-circular depression, said cassette case having a mounting part with a non-circular projection for fitting into and engaging said non-circular depression in said fixed shaft, and said fixed shaft being fixed to said cassette case by a screw when said non-circular depression is fitted over said non-circular projection.

* * * * *